(12) United States Patent
Vanstone et al.

(10) Patent No.: US 6,782,100 B1
(45) Date of Patent: Aug. 24, 2004

(54) ACCELERATED FINITE FIELD OPERATIONS ON AN ELLIPTIC CURVE

(75) Inventors: Scott Vanstone, Waterloo (CA); Ronald Mullin, Waterloo (CA); Adrian Antipa, Mississauga (CA); Robert Gallant, Burlington (CA)

(73) Assignee: Certicom Corp., Mississauga (CA)

( * ) Notice: Subject to any disclaimer, the term of this patent is extended or adjusted under 35 U.S.C. 154(b) by 556 days.

(21) Appl. No.: 09/677,785

(22) Filed: Oct. 2, 2000

Related U.S. Application Data

(63) Continuation of application No. 09/047,518, filed on Mar. 25, 1998, now abandoned, which is a continuation-in-part of application No. 08/790,987, filed on Jan. 29, 1997, now Pat. No. 6,141,420.

(30) Foreign Application Priority Data

Mar. 25, 1997 (GB) ............................................. 9706150
Jun. 20, 1997 (GB) ............................................. 9713138

(51) Int. Cl.[7] .............................................. H04L 9/30
(52) U.S. Cl. .......................... 380/28; 380/259; 380/30; 380/28; 380/285; 380/278; 713/171; 713/168
(58) Field of Search ................................. 713/171, 168; 380/259, 30, 28, 285, 24, 278, 279

(56) References Cited

U.S. PATENT DOCUMENTS

| | | |
|---|---|---|
| 4,587,627 A | 5/1986 | Omura et al. |
| 4,745,568 A | 5/1988 | Onyszchuk et al. |
| 4,989,171 A | 1/1991 | Hollmann |
| 5,146,500 A | 9/1992 | Maurer |
| 5,150,411 A | 9/1992 | Maurer |
| 5,159,632 A | 10/1992 | Crandall |
| 5,271,061 A | 12/1993 | Crandall |
| 5,272,755 A | 12/1993 | Miyaji et al. |
| 5,351,297 A | 9/1994 | Miyaji et al. |
| 5,442,707 A | 8/1995 | Miyaji et al. |
| 5,463,690 A | 10/1995 | Crandall |
| 5,497,423 A | 3/1996 | Miyaji |
| 5,627,893 A | 5/1997 | Demytko |
| 5,737,424 A | 4/1998 | Elteto et al. |
| 5,999,626 A | 12/1999 | Mullin et al. |
| 6,036,581 A | 3/2000 | Aoki |

FOREIGN PATENT DOCUMENTS

CA  WO 96/04602  2/1996

OTHER PUBLICATIONS

Menezes, Alfred, "Elliptic Curve Cryptosystems", a thesis presented to the University of Waterloo (1992), pp. 1–93.
Miller, Victor S., "Use of Elliptic Curves in Cryptography", Crypto '85, LNCS 218, Springer Vertag (1985), pp. 417–426.

(List continued on next page.)

*Primary Examiner*—Gilberto Barrón
*Assistant Examiner*—Joseph M McArdle
(74) *Attorney, Agent, or Firm*—Pillsbury Winthrop LLP

(57) ABSTRACT

A method for multiplication of a point P on elliptic curve E by a value k in order to derive a point kP comprises the steps of representing the number k as vector of binary digits stored in a register and forming a sequence of point pairs (P1, P2) wherein the point pairs differed most by P and wherein the successive series of point pairs are selected either by computing (2mP,(2m+1)P) from (mP,(m+1)P) or ((2m+1)P,(2m+2)P) from (mP,(m+1)P). The computations may be performed without using the y-coordinate of the points during the computation while allowing the y-coordinate to be extracted at the end of the computations, thus, avoiding the use of inversion operations during the computation and therefore, speeding up the cryptographic processor functions. A method is also disclosed for accelerating signature verification between two parties.

33 Claims, 4 Drawing Sheets

OTHER PUBLICATIONS

Menezes, Alfred et al., "The Implementation of Elliptic Curve Cryptosystems", Advances in Cryptology—Auscrypt '90, Jan. 8–11, 1990, pp. 2–13, vol. 453 of "Lecture Notes in Computer Science", Sydney, Australia.

Miyaji, Atsuko, "Elliptic Curves Suitable for Cryptosystems", 2334a IEICE Transactions on Fundamentals of Electronics, Communications and Computer Sciences E77–A (1994) Jan., pp. 98–104, No. 1, Tokyo, Japan.

Wang, Charles C. et al., "VLSI Architectures for Computing Multiplications and Inverses in GF(2m)", IEEE Transactions on Computers, Aug. 8, 1985, pp. 709–717, paragraph IV, vol. c–34, No. 8, New York, US.

Menezes, Alfred, "Elliptic Curve Cryptosystems", a thesis presented to the University of Waterloo (1999) pp. 1–93.

Menezes et al., "Elliptic Curve Cryptosystems and Their Implementation," Journal of Cryptology, Autumn 1993, vol. 6 No. 4, pp. 209–224.

Agnew et al., "An Implementation of Elliptic Curve Crytosystems over $F_{2^{155}}$," IEEE Journal on Selected Areas in Communications, Jun. 1993, vol. 11 No. 5, pp. 804–813.

ACCELERATED FINITE FIELD OPERATIONS ON AN ELLIPTIC CURVE

This is a Continuation of: National application Ser. No. 09/047,518, filed Mar. 25, 1998 abn, which is a C-I-P of U.S. application Ser. No. 08/790,987, filed Jan. 29, 1997 now U.S. Pat. No. 6,141,420.

This invention relates to a method of accelerating operations in a finite field, and in particular, to operations performed in a field $F_{2^m}$ such as used in encryption systems.

BACKGROUND OF THE INVENTION

Finite fields of characteristic two in $F_{2^m}$ are of interest since they allow for the efficient implementation of elliptic curve arithmetic. The field $F_{2^m}$ can be viewed as a vector space of dimension m over $F_2$. Once a basis of $F_{2^m}$ over $F_2$ has been chosen the elements of $F_{2^m}$ can be conveniently represented as vectors of elements zero or one and of length m. In hardware, a field element is stored in a shift register of length m. Addition of field elements is performed by bitwise XOR-ing ($\oplus$) the vector representations and takes one clock cycle.

Digital signatures are used to confirm that a particular party has sent a message and that the contents have not been altered during transmission.

A widely used set of signature protocols utilizes the ElGamal public key signature scheme that signs a message with the sender's private key. The recipient may then verify the signature with the sender's public key.

Various protocols exist for implementing such a scheme and some have been widely used. In each case however the recipient is required to perform a computation to verify the signature. Where the recipient has adequate computing power this does not present a particular problem but where the recipient has limited computing power, such as in a "Smart card" application, the computations may introduce delays in the verification process. Public key schemes may be implemented using one of a number of groups in which the discrete log problem appears intractable but a particularly robust implementation is that utilizing the characteristics of points on an elliptic curve over a finite field. This implementation has the advantage that the requisite security can be obtained with relatively small orders of field compared with for example with implementations in $Z_p^{\rightarrow}$ and therefore reduces the bandwidth required for communicating the signatures.

In a typical implementation a signature component s has the form:

$$s = ae + k \pmod{n}$$

where:

P is a point on the curve, which is predefined parameter of the system;

k is a random integer selected as a short term private or session key, and has a corresponding short term public key R=kP;

a is the long term private key of the sender and has a corresponding public key aP=Q;

e is a secure hash, such as the SHA hash function, of a message m and short term public key R; and n is the order of the curve.

The sender sends to the recipient a message including m, s, and R and the signature is verified by computing th value R'=(sP−cQ) which should correspond to R. If the computed values are equivalent then the signature is verified.

In order to perform the verification it is necessary to compute a number of point multiplications to obtain sP and eQ, each of which is computationally complex.

If $F_q$ is a finite field, the elliptic curves over $F_q$ can be divided into two classes, namely supersingular and non-supersingular curves. If $F_q$ is of characteristic 2, i.e. $q=2^M$, then the classes are defined as follows.

i) The set of all solutions to the equation $y^2+ay=x^3+bx+c$ where $a,b,c \in F_q$, $a \neq 0$, together with a special point called the point at infinity O is a supersingular curve over $F_q$.

ii) The set of all solutions to the equation $y^2+xy=x^3ax^2+b$ where $a,b \in F_q$, $b \neq 0$, together with a special pointed called the point at infinity O is a nonsupersingular curve over $F_q$.

By defining an appropriate addition on these points, we obtain an additive abelian group. The addition of two points $P(x_1,y_1)$ and $Q(x_2,y_2)$ for the supersingular elliptic curve E with $y^2+ay=x^3+bx-c$ is given by the following:

If $P(x_1,y_1) \in E$; then define $-P=(x_1,y_1+a)$, $P+O=O+P=P$ for all $P \in E$.

If $Q=(x_2,y_2) \in E$ and $Q \neq -P$, then the point representing the sum of $P+Q$, is denoted $(x_3,y_3)$, where $$x_3 = \left\{ \left( \frac{y_1 \oplus y_2}{x_1 \oplus x_2} \right)^2 \oplus x_1 \oplus x_2 \right. \quad (T \neq Q) \text{ or}$$

$$x_3 = \left\{ \frac{x_1^2 \oplus b^7}{a^2} \right. \quad (P = Q) \text{ and}$$

$$y_3 = \left\{ \left( \frac{y_1 \oplus y_2}{x_1 \oplus x_2} \right) \oplus (x_1 \oplus x_3) \oplus y_1 \oplus a \right. \quad (P \neq Q) \text{ or}$$

$$y_3 = \left\{ \left( \frac{x_1^2 \oplus b}{a} \right) \oplus (x_1 \oplus x_3) \oplus y_1 \oplus a \right. \quad (P-Q)$$

The addition of two points $P(x_1,y_1)$ and $Q(x_2,y_2)$ for the nonsupersingular elliptic curve $y^3+xy=x^3+ax^3+b$ is given by following:

If $P=(x_1,y_1) \in E$ then define $-P=(x_1,y_1+x_1)$. For all $P \in E$, $O+P=P+O=P$. If $Q=(x_2,y_2) \subset E$ and $Q \neq -P$, then $P+Q$ is a point $(x_3,y_3)$, where $$x_3 = \left\{ \left( \frac{y_1 \oplus y_2}{x_1 \oplus x_2} \right)^2 \oplus \frac{y_1 \oplus y_2}{x_1 \oplus x_2} \oplus x_1 \oplus x_2 a \right. \quad (P \neq Q) \text{ or}$$

$$x_3 = \left\{ x_1^2 \oplus \frac{b}{x_1^2} \right. \quad (P=Q)] \text{ and}$$

$$y_3 = \left\{ \left( \frac{y_1 \oplus y_2}{x_1 \oplus x_2} \right) \oplus (x_1 \oplus x_3) \oplus x_3 \oplus y_1 \right. \quad (P \neq Q) \text{ or}$$

$$y_3 = \left\{ x_1^2 \left( x_1 \oplus \frac{y_1}{x_1} \right) \oplus x_1 \oplus x_3 \right. \quad (P=Q)$$

Now supersingular curves are preferred, as they are more resistant to the MOV attack. It can be seen that computing the sum of two points on E requires several multiplications, additions, and inverses in the underlying field $F_{2^m}$. In turn, each of these operations requires a sequence of elementary bit operations.

When implementing cryptographic operations in ElGamal or Diffie-Hellman schemes or generally most cryptographic operations with elliptic curves, one is required to compute $kP=P+P+\ldots+P$ (P added k times) where k is a positive integer and $P \in E$. This requires the computation of $(x_3,y_3)$ to be computed k−1 times. For large values of k which are typically necessary in cryptographic applications, this has previously been considered impractical for data communication. If k is large, for example 1024 bits, kP would be calculated by performing $2^{1024}$ additions of P.

Furthermore, in a multiplicative group, multiplications and inversions are extremely computationally intensive, with field inversions being more expensive than field multiplications. The inversion operation needed when adding two points can be eliminated by resorting to projective coordinates. The formula for addition of two points however, requires a larger number of multiplications than is required when using affine coordinates.

In a paper entitled "Elliptic Curve Cryptosystems and Their Implementation" by Vanstone et al., published in The Journal of Cryptology, a method is described for adding two points by converting to projective coordinates and thus eliminating the inversion computation. However the overall gain in speed by elimination of the inversion is at the expense of space. Extra registers are required to store P and Q and also to store intermediate results when doing the addition. Furthermore, this method requires the use of the y-coordinate in the calculation.

SUMMARY OF THE INVENTION

It is therefore an object of the present invention to provide a method and apparatus in which some of the above disadvantages are obviated or mitigated.

It is a further object of the invention to provide a method of multiplying finite field elements, and which may be implemented relatively efficiently on a processor with limited processing capability, such as a smart card or the like.

It is a still further object of the present invention to provide a method and apparatus in which signature verification may be accelerated in elliptic curve encryption systems.

In accordance with this invention there is provided a method of determining a multiple of a point P on an elliptic curve defined over a field $F_{2^M}$, said method comprising steps of:

a) representing the number k as a vector of binary digits $k_i$;

b) forming a pair of points $P_1$ and $P_2$, wherein the point $P_1$ and $P_2$ differ at most by P; and c) selecting each of the $k_i$ in turn and for each of the $k_i$, upon the $k_i$ being a one, adding the pair of points $P_1$ and $P_2$ to form a new point $P_1$ and adding the point P to $P_1$ to form a new point $P_2$, the new points replacing the pair of points $P_1$ and $P_2$; or upon the $k_i$ being a zero, doubling the point $P_1$ to form a new point $P_1$ and adding the point P to form a new point $P_2$, the new points replacing the pair of points $P_1$ and $P_2$, whereby the product kP is obtained from the point $P_1$ in M−1 steps and wherein M represents the number of digits in k.

Furthermore, the inventors have implemented a method whereby computation of a product kP can be performed without the use of the y coordinate of the point P during computation.

BRIEF DESCRIPTION OF THE DRAWINGS

Embodiments of the present invention will now be described by way of example only with reference to the accompanying drawings in which.

DETAILED DESCRIPTION OF A PREFERRED EMBODIMENT

Figure 1:
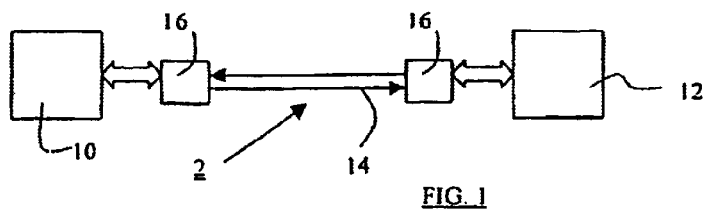
FIG. 1 is a schematic representation of a data communication system.

Referring to FIG. 1, a data communication system 2 includes a pair of correspondents, designated as a sender 10, and a recipient 12, connected via a communication channel 14. Each of the correspondents 10, 12 includes an encryption/decryption unit 16 associated therewith that may process digital information and prepare it for transmission through the channel 14 as will be described below. The encryption/decryption units implement amongst, others key exchange protocols and an encryption/decryption algorithm.

Figure 2:
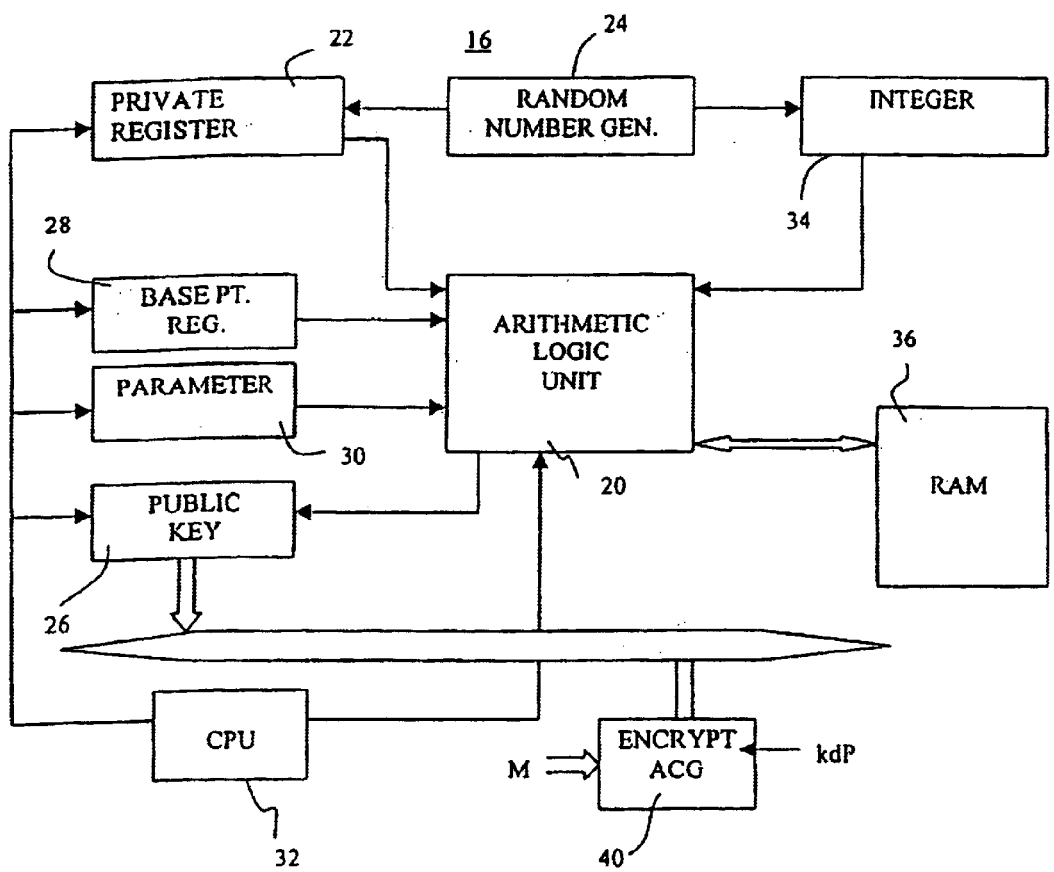
FIG. 2 is a schematic diagram of an encryption/decryption unit.

The module 16 is shown schematically in FIG. 2 and includes an arithmetic logic unit 20 to perform the computations including key exchange and generation. A private key register 22 contains a private key, d, generated for example as a 155 bit data string from a random number generator 24, and used to generate a public key stored in a public key register 26. A base point register 28 contains the co-ordinates of a base point P that lies in the elliptic curve selected with each co-ordinate (x, y), represented as a 155 bit data string. Each of the data strings is a vector of binary digits with each digit being the coefficient of an element of the finite field in the normal basis representation of the co-ordinate.

The elliptic curve selected will have the general form $y^2+xy=x^3+ax^2+b$ and the parameters of that curve, namely the coefficients a and b are stored in a parameter register 30. The contents of registers 22, 24, 26, 28, 30 may be transferred to the arithmetic unit 20 under control of a CPU 32 as required.

The contents of the public key register 26 are also available to the communication channel 14 upon a suitable request being received. In the simplest implementation, each encryption module 16 in a common secure zone will operate with the same curve and base point so that the contents of registers 28 and 30 need not be accessible. If further sophistication is required, however, each module 16 may select its own curve and base point in which case the contents of registers 28, 30 have to be accessible to the channel 14.

The module 16 also contains an integer register 34 that receives an integer k, the session seed, from the generator 24 for use in encryption and key exchange. The module 16 has a random access memory (RAM) 36 that is used as a temporary store as required during computations.

In accordance with a general embodiment, the sender assembles a data string, which includes amongst others, the public key Q of the sender, a message m, the senders short term public key R and a signature component s of the sender. When assembled the data string is sent over the channel 4 to the intended recipient 12.

For simplicity it will be assumed that the signature component s of the sender 12 is of the form s=ae+k(mod n) as discussed above although it will be understood that other signature protocols may be used. To verify the signature sP-eQ must be computed and compared with R.

Thus a first step of the recipient is to retrieve the value of Q from the string. A hash value e may also be computed from the message m and the coordinates of the point R. The recipient is then able to perform the verification by computing sP and eQ.

In order to accelerate the calculation of sP or eQ the recipient may adopt the following to calculate the coordinates of the new point sP, in order to avoid performing the several multiplications, additions and inverses in the underlying field $F_2^m$. The recipient may calculate sP by resorting to the expedient of a "double and add" method as shown in FIG. 3.

Figure 3:
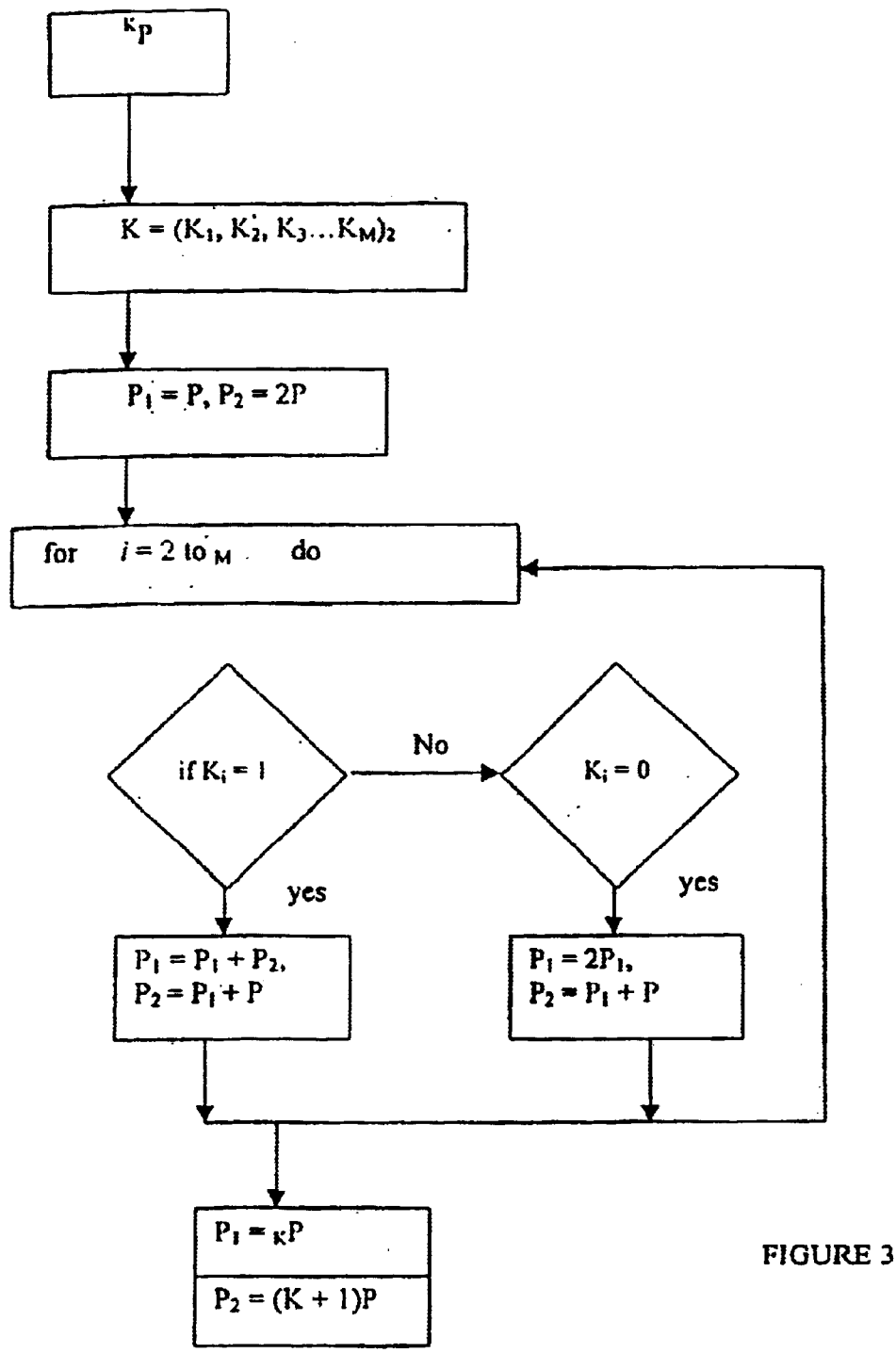
FIG. 3 is a flow chart for computing a multiple of a point.

Referring to FIG. 3 one embodiment of the invention illustrating a "double and add" method for multiplication a point P on an elliptic curve E by a value k in order to derive a point kP is implemented by initially representing k in its binary form. Next a successive series of point pairs (mP, (m+1)P) are set up. Each successive digit of k is considered in turn, upon the occurrence of a zero value digit in the binary representation of k, the first of the pair of points is doubled and one is added to the second of the pair of points i.e compute (2mP,(2m+1)P) from (mP,(m+1)P). Alternatively upon the occurrence of a one value in the binary representation of k, the first of the pair is formed from the sum of the previous pair of points and the second of the pair is formed by adding one to the first of the pair i.e. compute ((2m+1)P,(2m+2)P) from (mP,(m+1)P).

This is illustrated in the following short example: in which k=23. The value of k may be represented in binary as pairs (11011). Applying the above rule to a pair of points (P, 2P) we get the successive sequence of point, (2P, 3P); (5P, 6P); (11P, 12P); and finally (23P, 24P). The first of the pairs is thus the required point.

Thus, it may be seen the final result 23P is obtained by performing a series of "double and add" operations on a pair of points in the field wherein the pair of points in a given pair differ by P. Furthermore the number of "double and add" operations equals at most one less than the number of bits in k i.e. (m−1) times. This method of "double and add" has a distinct advantage for large values of k in reducing the number of operations to be performed by a processor. This may be contrasted with performing k double and adds on a single point P as described earlier in the background of the invention.

Turning back to the calculation of sP and eQ, the recipient may thus apply the above embodiment to calculating sP for the nonsupersingular elliptic curve $y^2+xy=x^3+ax^2+b$, E defined over $F_2^m$.

If $P_1=(x_1, y_1)$ and $P_2=(x_2, y_2)$, $P_1 \neq \pm P_2$, are points on the curve E then we can define $P_1+P_2=(x_3, y_3)$ where, $$x_3=\lambda^2+\lambda+x_1+x_2+a \quad (1)$$

wherein the slope of the curve is given by:

$$\lambda = \frac{y_2+y_1}{x_2+x_1}$$

Similarly, if $-P_2=(x_2, y_2+x_2)$ and $P_1-P_2=(x_4, y_4)$ then, $$x_4 - \overline{\lambda}^2 + \overline{\lambda} + x_1 + x_2 + a = \lambda^2 + \frac{x}{(x_1+x_2)^2} + \lambda + \frac{x_2}{x_1+x_2} + x_1 + x_2 + a \quad (2)$$

where $$\overline{\lambda} = \frac{y_2+x_2+y_1}{x_2+x_1} = \frac{x_2}{x_2+x_1} + \lambda$$

if we add $x_3$ and $x_4$ then, $$x_3 + x_4 = \frac{x}{(x_1+x_2)^2} + \frac{x_2}{x_1+x_2} = \frac{x_1 x_2}{(x_1+x_2)^2} \quad (3)$$

To compute the x-coordinate $x_3$ of $(P_1+P_2)$ we only need the x-coordinates of $P_1$, $P_2$ and $(P_1-P_2)$, however the computation is not optimally efficient as it requires inversions. It may also be noted that the y-coordinate is not needed in these calculations.

Referring back to FIG. 2, the value kP may be calculated using the "double and add" method. Whenever a new pair of points is computed the addition formula of equation (3) above is used and this is done m times.

Thus we have a formula for $x_3$ involving $x_1$, $x_2$ and $x_4$. Unfortunately, this formula includes an inversion, which is costly. We can modify this equation as follows, suppose the values of $x_1$, $x_2$ and $x_3$ are given by $$\frac{x_1}{z_1}, \frac{x_2}{z_2}, \frac{x_3}{z_3},$$

where of $x_1$, $x_2$, $x_3$, $z_1$, $z_2$, $z_3$ are values maintained during the double and add algorithm. Then substituting these new representations into formula (3), we find $$\frac{x_3}{z_3} = x_4 + \frac{\frac{x_1 x_2}{z_1 z_2}}{\left(\frac{x_1}{z_1}+\frac{x_2}{z_2}\right)^2} = x_4 + \frac{x_1 x_2 x_1 x_2}{(x_1 z_2 + x_2 z_1)^2} = \frac{x_4(x_1 z_2 + x_2 z_1)^2 + x_1 x_2 z_1 z_2}{(x_1 z_2 + x_2 z_1)^2}$$

Therefore, if we take $x_3=x_4(x_1 z_2+x_2 z_1)^2+x_1 x_2 z_1 z_2$ and $z_3=(x_1 z_2+x_2 x_1)^2$. We can execute the "double & add" algorithm of FIG. 3 (using this new representation) and avoid the computation of an inversion for most of the algorithm.

From equations for $x_3$ and $z_3$ above it may be seen that $x_3$ may be calculated by performing at most four multiplication operations.

The sum of the points $P_1$ and $P_2$ are expressed in terms of $x_3$ and $z_3$ is obtained without having to perform a relatively costly inversion on the x-coordinate, and can be computed using at most four multiplies and two squares. The remaining operations of addition and squaring are relatively inexpensive with regard to computational power. The computation of the term $(x_1 z_2+x_2 z_1)^3$ is obtained by a cyclic shift of the normal basis representation of the value within parentheses for which a general-purpose processor can perform relatively easily. At the end of the algorithm we can convert back to our original representation if required.

Referring back to FIG. 3, now in order to double point P $(x_1, y_1)$, let $2(x_1, y_1)=(x_3, y_3)$ then as before if the equation of the elliptic curve E is given by $y^2+xy=x^3+ax^2+b$ over $F_2^m$, the x-coordinate of the point 2P is represented as $$x_3 = x_1^2 + \frac{b}{x_1^2}.$$

Once again representing the coordinates in terms of the projective coordinates we obtain $$x_3=x_1^4+bz_1^4$$

and $$z_3=(x_1 z_1)^2$$

or $$x_3=(x_1+\sqrt[4]{b}z_1)$$

By making b relatively small the computationally expensive operations may be reduced to approximately one multiplication operation for the $z_3$ term. We can precompute $\sqrt[4]{b}$ and calculate $x_3$ according to the last equation, thus requiring two less squares. Alternatively, as mentioned earlier in a normal basis representation the computation of $x_1^4$ and $z_1^4$ is obtained by two cyclic shifts of the representation of the respective values, while $(x_1z_1)^2$ is obtained by a single cyclic shift of the product.

Applying the earlier outlined "double and add" method of FIG. 3, we observe that for a scalar k of m bits and calculation of kP defined over $F_2^m$ requires at most (m−1) double and add operations. From the above discussion a double operation on points of an elliptic curve are achieved by performing at most two multiplication operations, while the add operation is achieved by performing at most four multiplication operations. Thus to compute the x-coordinate of kP using the method of this invention would require at most six times (m−1) multiplication operations.

Once the x values have been calculated, as above, y-coordinate values may also be determined. However, for each x-coordinate there exists at most two y-coordinates. For example, in the final step of obtaining a point 24P, both points 23P and P would be known, since 24P may be expressed as 23P+P=24P. Assume the x-coordinate $x_{23}$ of the point A=23P have been obtained as described earlier. Then, by substituting $x_{23}$ into the elliptic curve equation E and solving the resulting quadratic equation, two values of y are obtained corresponding to points $A=(x_{23}, y_{23}^{(1)})$ and $B=(x_{23}, y_{23}^{(2)})$. Next, by substitution, the x-coordinate $x_{24}$ obtained through calculating 24P=P+23P into the elliptic curve equation will produce two points $(x_{24}, y_{24}^{(1)})$ and $(x_{24}, y_{24}^{(2)})$. The two points thus obtained are stored. To the point A+B are added, point P using ordinary point addition to produce corresponding points $A+P=(x_a, y_a)$ and $B+P=(x_b, y_b)$, respectively. Point $(x_a, y_a)$ is compared to points $(x_{24}, y_{24}^{(1)})$ and $(x_{24}, y_{24}^{(2)})$, respectively. If none of the points match, then $(x_b, y_b)$ is the correct point, otherwise $(x_a, y_a)$ is the correct point. Thus, it may be seen that multiples of a point P may be easily calculated without knowing the y-coordinate and, furthermore, the y-coordinate may be obtained at the end of the calculation, if so desired.

Thus, for example referring back to the ElGamal scheme for elliptic curves one is required to compute r=kP=(x,y). In this case one can drop the y-coordinate and produce a hash of a message m and the x-coordinate e=h(m//x). The sender then sends to a recipient a message including a signature s and the hash e. The signature s has the form s=(de+k)mod n, where d is the private key of the sender and k is a random number generated by the sender. The recipient then verifies the signature by calculating sP−eQ=r. Both sP and eQ may be calculated by utilizing the "double and add" method of this invention. The x values of sP and eQ each produce two possible values of y: $(x_1, y_1^{(1)})$, $(x_1, y_1^{(2)})$ and $(x_2, y_2^{(1)})$, $(x_2, y_2^{(2)})$ when substituted back into the elliptic curve equation E. When the point subtraction is performed between permutations of these points, the correct y will thus produce the appropriate matching r. If none of these substitutions produce a matching r, then the signature is not verified.

Figure 4:
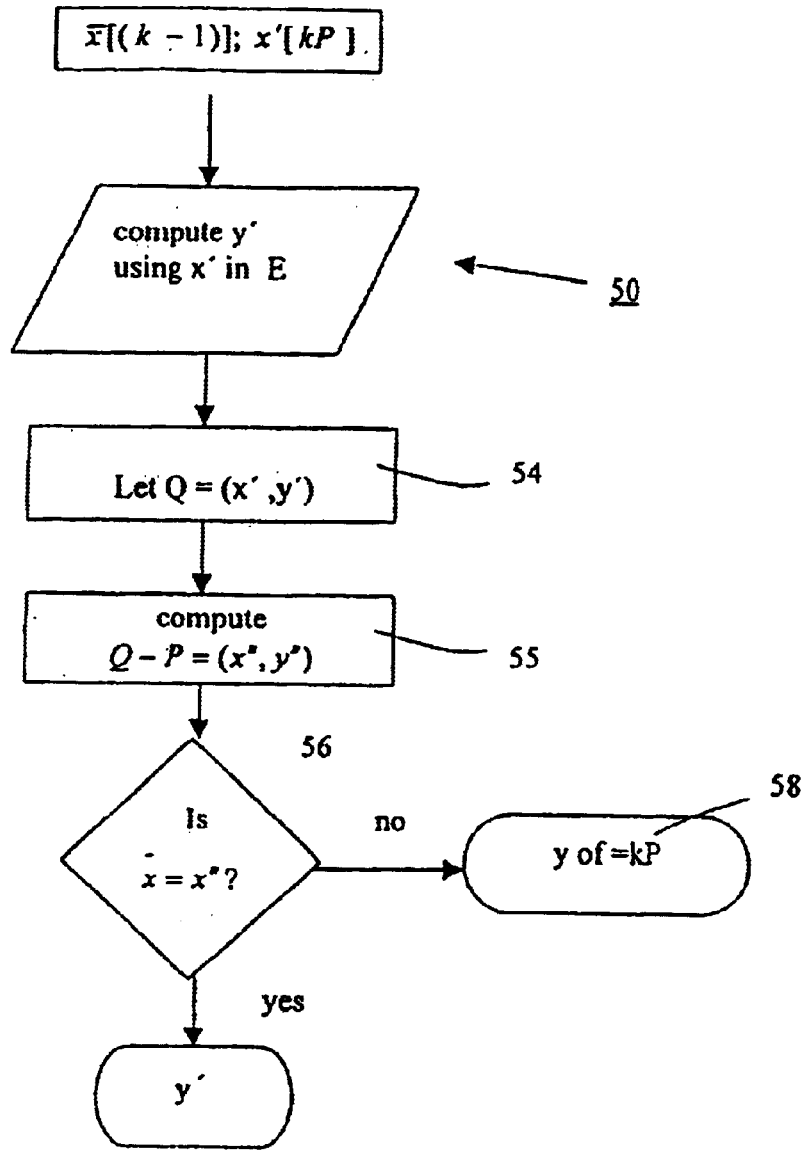
FIG. 4 is a flow chart showing the extraction of an y-coordinate.

Referring to FIG. 4, a schematic diagram of a further method for determining the y-coordinate of kP derived according to the method described with respect to FIG. 3, and given the point P=(x, y) and the x-coordinate $\bar{x}$ of (k−1)P and x' of kP is shown generally by numeral 50. As may be noted with respect to FIG. 3 in computing the x-coordinate of kP the x-coordinate of (k−1)P is also calculated.

Thus, initially substitute into the elliptic curve equation to obtain a value of y' such that the point (x',y') is on the curve. Next at step 54 assign the point Q to (x',y'). Next complete a point Q−P=(x",y") by simple point subtraction 55. The derived x-coordinate x" is compared to the x-coordinate $\bar{x}$ of (k−1) at step 56 and if x"=$\bar{x}$, then y' is the y-coordinate of kP, otherwise y' is the y-coordinate of −kP. It may be noted that this method works if 0<k<order of point P.

Utilizing the method of the subject invention to compute kP it is also possible to compute (k+1)P such that the x-coordinates on kP and (k+1)P are available. In this case the y-coordinate may be derived by computing Q+P=(x", y") and comparing the coordinate x" to the x-coordinate of (k+1)P.

Figure 5:
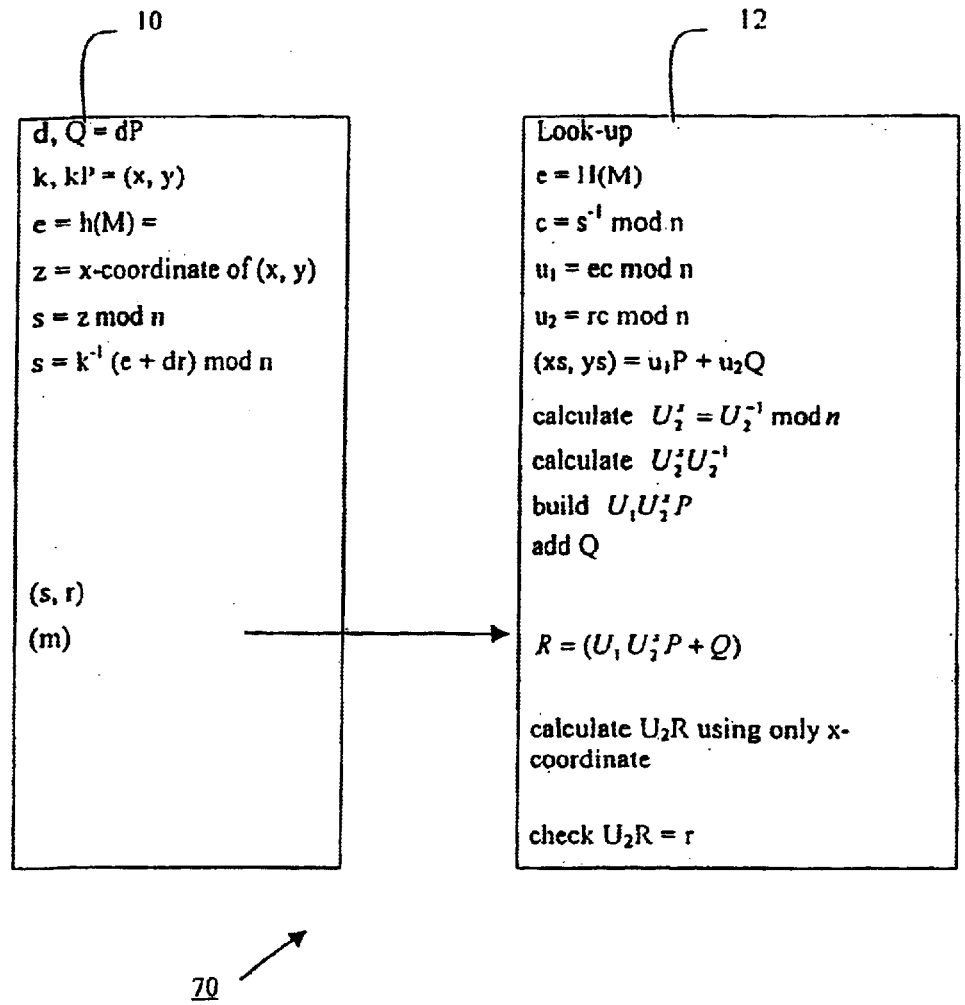

Referring to FIG. 5, a further application of an embodiment of the invention to verification of elliptic curve signatures is indicated generally by numeral 70. Once again it is assumed that the first correspondent 10 includes a private key random integer d and a corresponding public key Q derived from computing the point Q=dP. In order to sign a message M, a hash value e is computed from the message M using a hash function H. Next, a random integer k is selected as a private session key. A corresponding public session key kP is calculated from the random integer k. The first correspondent then represents the x-coordinate of the point kP as an integer z and then calculates a first signature component r=z mod n.

Next, a second signature component $s=k^{-1}(e+dr) \bmod n$ is also calculated. The signature components s and r and a message M is then transmitted to the second correspondent 12. In order for the second correspondent 12 to verify the signature (r,s) on M, the second correspondent looks up the public key Q of the first correspondent 10. A hash e' of the message M is calculated using the hash function H such that e'=H(M). A value $c=s^{-1} \bmod n$ is also calculated. Next, integer values $u_1$ and $u_2$ are calculated such that $u_1$=e'c mod n and u2=rc mod n. In order that the signature be verified, the value $u_1P+u_2Q$ must be calculated. Since P is known and is a system wide parameter, the value $u_1P$ may be completed quickly using pre-computed multiple of P. For example, those values may be combined from a pre-stored table of doubles of P, i.e. 2P, 4P, 8P, etc. On the other hand however, the point Q is current and varies from user to user and, therefore, the value $u_2Q$ may take some time to compute and generally cannot be pre-computed.

However, by resorting to the expedient of the method disclosed in the subject invention, verification of the signature may be significantly accelerated. Normally, the point $R=u_1P+u_2Q$ is computed. The field element x of the point R=(x,y) is converted to an integer z, and a value v=z mod n is computed. If v=r, then the signature is valid.

Alternatively, a technique which takes advantage of "double & add" to compute $u_2Q$ if the modular inverse of $u_2$ is calculated $u_2'=u_2^{-1} \bmod n$, then R can be expressed as $u_2(u_1u_2'P+Q)$ i.e. making use of the identity $u_2u_2'$=1. The value $u_1 u_2'$ is an integer and, therefore, may be easily computed. Thus, the point $u_1u_2'P$ may be easily calculated or assembled from the previously stored values of multiples of P. The point Q is then added to the point $u_1u_2'P$, which is a single addition, to obtain a new point R'.

Thus, in order to verify the signatures, the recipient need only to determine the x coordinate of the value $u_2R'$. This calculation may be performed using the "double and add" method as described with reference to FIG. 3. If this is equal to r, then the signature is verified. The resulting value is the x-coordinate of the point $u_1P+u_2Q$. The value v=x mod n is computed and verified against r. It may be noted that in this scheme, the y-coordinate is not used in signature generation or verification and, hence, computing is not mandatory. However, alternative schemes for both x and y-coordinates may be utilized in these cases and the y coordinate may be derived as described earlier or the two y-coordinates corresponding to the given x-coordinate may be calculated and each used to attempt to verify the signature. Should neither satisfy this comparison, then signature is invalid. That is, since verification requires computing the point $R=U_1P+U_2Q$. This can be done as follows. Transmit only the x coordinate of Q, compute the x-coordinate of $U_2Q_2$, by using either the "double & add" of FIG. 3 or on $E(F_p)$. Try both points corresponding to this x-coordinate to see if either verifies.

Referring back to FIG. 1 if keys are transferred between the correspondents of the form kP then to reduce the bandwidth it is possible for the sender to transmit only one of the co-ordinates of kP and compute the other coordinate at the receiver. For example if the field elements are 155 bits for $F_2^{155}$, an identifier, for example a single bit of the correct value of the other co-ordinate, may also be transmitted. This permits the possibilities for the second co-ordinate to be computed by the recipient and the correct one identified from the identifier.

Referring therefore to FIG. 1, the transmitter 10 initially retrieves as the public key dP of the receiver 12, a bit string representing the co-ordinate $x_0$ and a single bit of the co-ordinate $y_0$.

The transmitter 10 has the parameters of the curve in register 30 and therefore may use the co-ordinate $x_0$ and the curve parameters to obtain possible values of the other co-ordinate $y_0$ from the arithmetic unit 20.

For a curve of the form $y^2+xy=x^3+ax^2+b$ and a co-ordinate $x_0$, then the possible values $y_1, y_2$ for $y_0$ are the roots of the quadratic $y^2+x_0y=x_0^3+ax_0^2+b$.

By solving for y, in the arithmetic unit 20 two possible roots will be obtained and comparison with the transmitted bit of information will indicate which of the values is the appropriate value of y.

The two possible values of the second co-ordinate $(y_0)$ differ by $x_0$, i.e. $y_1-y_2+x_0$. Since the two values of $y_0$ differ by $x_0$, then $y_1$ and $y_2$ will always differ where a "1" occurs in the representation of $x_0$. Accordingly the additional bit transmitted is selected from one of those positions and examination of the corresponding bit of values of $y_0$, will indicate which of the two roots is the appropriate value.

The receiver 10 thus can generate the co-ordinates of the public key dP even though only 156 bits are retrieved.

Similar efficiencies may be realized in transmitting the session key kP to the receiver 12 as the transmitter 10 need only forward one co-ordinate, $x_0$ and the selected identifying bit of $y_0$. The receiver 12 may then reconstruct the possible values of $y_0$ and select the appropriate one.

In the field $F_{2^m}$ it is not possible to solve for y using the quadratic formula as $2a=0$. Accordingly, other techniques need to be utilised and the arithmetic unit 20 is particularly adapted to perform this efficiently.

In general provided $x_0$ is not zero, if $y=x_0z$ then $x_0^2z^2+x_0^2z=ax_0^2++b$. This may be written as $$z^2 + z = x_0 + a + \frac{b}{x_0^2}1 = c.$$

i.e. $2^2+z=c$.

If m is odd then either $z=c+c^4+c^{16}+ \ldots +c^{2m-1}$
or $z=1+c+ \ldots +c^{2m-1}$ to provide two possible values for $y_0$.

A similar solution exists for the case where m is even that also utilises terms of the form $c^{2m}$.

This is particularly suitable for use with a normal basis representation in $F_{2^m}$.

As noted above, raising a field element in $F_{2^m}$ to a power g can be achieved by a g fold cyclic shift where the field element is represented as a normal basis.

Accordingly, each value of z can be computed by shifting, and adding and the values of $y_0$ obtained. The correct one of the values is determined by the additional bit transmitted.

The use of a normal basis representation in $F_{2^m}$ therefore simplifies the protocol used to recover the co-ordinate $y_0$.

If $P=(x_0y_0)$ is a point on the elliptic curve E: $y^2+xy=x^3+ax^2+b$ defined over a field $F_{2^m}$, then $y_0$ is defined to be 0 if $x_0=0$; if $x_0 \neq 0$ then $y_0$ is defined to be the least significant bit of the field element $y_0 \cdot x_0^{-1}$.

The x-coordinate $x_0$ of P and the bit $y_0$ are transmitted between the transmitter 10 and receiver 12. Then the y-coordinate $y_0$ can be recovered as follows:

1. If $x_0=0$ then $y_0$ is obtained by cyclically shifting the vector representation of the field element b that is stored in parameter register 30 one position to the left. That is, if $b=b_{m-1}b_{m-2} \ldots b_1b_0$ then $y=b_{m-2} \ldots b_1b_0b_{m-1}$ 2. If $x_0 \neq 0$ then do the following:
   2.1 Compute the field element $c=x_0+a+bx_0^{-2}$ in $F_2^m$.
   2.2 Let the vector representation of c be $c=c_{m-1}c_{m-2} \ldots c_1c_0$.
   2.3 Construct a field element $z=z_{m-1}z_{m-2} \ldots z_1z_0$ by setting
   $z_0=y_0$,
   $z_1=c_0 \oplus z_0$,
   $z_2=c_1 \oplus z_1$,
   $z_{m-2}=c_{m-3} \oplus z_{m-3}$,
   $z_{m-1}=c_{m-2} \oplus z_{m-2}$.
   2.4 Finally, compute $y_0=x_0 \cdot z$.

It will be noted that the computation of $x_0^{-2}$ can be readily computed in the arithmetic unit as described above and that the computation of $y_0$ can be obtained from the multiplier 48.

In the above examples, the identification of the appropriate value of $y_0$ has been obtained by transmission of a single bit and a comparison of the values of the roots obtained. However, other indicators may be used to identify the appropriate one of the values and the operation is not restricted to encryption with elliptic curves in the field $GF(2^m)$. For example, if the field is selected as $Z_p$ p=3(mod 4) then the Legendre symbol associated with the appropriate value could be transmitted to designate the appropriate value. Alternatively, the set of elements in Zp could be subdivided into a pair of subsets with the property that if y is in one subset, then −y is in the other, provided y≠0. An arbitrary value can then be assigned to respective subsets and transmitted with the co-ordinate $x_0$ to indicate in which subset the appropriate value of $y_0$ is located. Accordingly, the appropriate value of $y_0$ can be determined. Conveniently, it is possible to take an appropriate representation in which the subsets are arranged as intervals to facilitate the identification of the appropriate value of $y_e$. It may be noted that one of the methods described earlier may also be sued to derive the coordinate.

These techniques are particularly suitable for encryption utilizing elliptic curves but may also be used with any algebraic curves and have applications in other fields such as error correcting coding where co-ordinates of points on curves have to be transferred.

It will be seen therefore that by utilising an elliptic curve lying in the finite field $GF_2^m$ and utilising a normal basis representation, the computations necessary for encryption with elliptic curves may be efficiently performed. Such operations may be implemented in either software or hardware and the structuring of the computations makes the use of a finite field multiplier implemented in hardware particularly efficient.

The present invention is thus generally concerned with an encryption method and system and particularly an elliptic curve encryption method and system in which finite field elements is multiplied in a processor efficient manner. The encryption system can comprise any suitable processor unit such as a suitably programmed general-purpose computer.

We claim:

1. A method of computing a public key kP in an elliptic curve cryptosystem, said method comprising:
   a) utilising the x coordinate of a seed point P to perform successive double and add operations on P to obtain the values of the x coordinates of (k−1)P and kP;
   b) determining at least one point on the elliptic curve corresponding to one of the possible values of (k−1)P by deriving a possible value of the y coordinate of (k−1)P from the x coordinate of (k−1)P;
   c) determining at least one point on the elliptic curve corresponding to one of the possible values of kP by deriving a possible value of the y coordinate of kP from the x coordinate of kP;
   d) selecting as the value of kP the one of the possible points corresponding to kP that differs by P from one of the possible points corresponding to (k−1)P to form the public key kP.

2. A method according to claim 1, further comprising the step of utilizing the values of the x and y coordinates of kP to represent kP.

3. A method according to claim 1, wherein a) comprises using a bit of k and a pair of points dP and (d+1)P to compute:
   a) a pair of points 2dP, (2d+1)P when said bit is equal to 0; and
   b) a pair of points (2d+1)P, (2d+2)P when said bit is equal to 1.

4. A method according to claim 3, wherein:
   a) said point 2dP is computed by doubling dP, and said point (2d+1)P is computed by adding P to said point 2dP;
   b) said point (2d+1)P is computed by adding dP and (d+1)P and said point (2d+2)P is computed by doubling (d+1)P.

5. A method according to claim 1, wherein said seed point P is represented using projective coordinates.

6. A method according to claim 1, wherein said y coordinate of kP is determined by:
   a) computing a first possible y coordinate for each of (k−1)P and kP;
   b) adding P to said first possible y coordinate of (k−1)P to obtain a first resultant y coordinate;
   c) comparing said first possible y coordinate of kP to said first resultant y coordinate;
   d) when said first coordinates are equal, determining the value of said first possible y coordinate to be the value of said y coordinate of kP;
   e) when said first coordinates are not equal:
      i) computing a second possible y coordinate for kP;
      ii) comparing said second possible y coordinate of kP to said first resultant y coordinate;
      iii) when said second possible y coordinate of kP is equal to said first resultant y coordinate, determining the value of said second possible y coordinate of kP to be the value of said y coordinate of kP;
      iv) when said second possible y coordinate of kP is not equal to said first resultant y coordinate, computing a second possible y coordinate for (k−1)P, adding P to said second possible y coordinate for (k−1)P to obtain a second resultant y coordinate, and determining said second resultant y coordinate for kP to be the value of said y coordinate of kP.

7. A method according to claim 6, wherein said possible y coordinates of (k−1)P and kP are computed by substituting the corresponding x values of (k−1)P and kP into a defining equation of the elliptic curve.

8. A method according to claim 1, wherein said y coordinate of kP is determined by:
   a) computing a first possible y coordinate for each of (k−1)P and kP;
   b) subtracting P from sad first possible y coordinate of kP to obtain a first resultant y coordinate;
   c) comparing said first possible y coordinate of (k−1)P to said first resultant y coordinate;
   d) when said first coordinates are equal, determining the value of said first possible y coordinate of kP to be the value of said y coordinate of kP;
   e) when said first coordinates are not equal:
      i) computing a second possible y coordinate for (k−1)P.
      ii) comparing said second possible y coordinate of (k−1)P to said first resultant y coordinate;
      iii) when said second possible y coordinate of (k−1)P is equal to said first resultant y coordinate, determining the value of said first possible y coordinate of kP to be the value of said y coordinate of kP;
      iv) when said second possible y coordinate of (k−1)P is not equal to said first resultant y coordinate, computing a second possible y coordinate for kP, and determining said second possible y coordinate for kP to be the value of said y coordinate of kP.

9. A method according to claim 1, wherein said y coordinate of kP is determined by:
   a) computing a first possible y coordinate for each of kP and (k+1)P;
   b) adding P to said first possible y coordinate of kP to obtain a first resultant y coordinate;
   c) comparing said first possible y coordinate of (k+1)P to said first resultant y coordinate;
   d) when said first coordinates are equal, determining the value of said first possible y coordinate of kP to be the value of said y coordinate of kP;
   e) when said fist coordinates are not equal:
      i) computing a second possible y coordinate for (k+1)P;
      ii) comparing said second possible y coordinate of (k+1)P to said first resultant y coordinate;
      iii) when said second possible y coordinate of (k+1)P is equal to said first resultant y coordinate, determining the value of said first resultant y coordinate to be the value of said y coordinate of kP;
      iv) when said second possible y coordinate of (k+1)P is not equal to said first resultant y coordinate, computing a second possible y coordinate for kP, and determining said second possible y coordinate for kP to be the value of said y coordinate of kP.

10. A method according to claim 1, further comprising:
    a) obtaining an identifier from the y coordinate of kP;
    b) utilizing said identifier and the x coordinate of kP to represent kP.

11. A method according to claim 10, wherein said identifier is a single bit of said y coordinate of kP.

12. A method of computing a public key kP from a seed point P=(x, y) in an elliptic curve cryptosystem, said method comprising:
   a) computing projective X and Z coordinates of P;
   b) utilising the projective X and Z coordinates of P to perform successive double and add operations on P to obtain the values of the X and Z coordinates of (k−1)P and kP;
   c) combining the values of the X and Z coordinates of the points (k−1)P and P to obtain the values of the affine x coordinates of (k−1)P and P;
   d) determining at least one point on the elliptic curve corresponding to one of the possible values of (k−1)P by deriving a possible value of the y coordinate of (k−1)P from the x cooperate of (k−1)P;
   e) determining at least one point on the elliptic curve corresponding to one of the possible values of kP by deriving a possible value of the y coordinate of kP from the x coordinate of kP;
   f) selecting as the value of kP the one of the possible points corresponding to kP that differs by P from one of the possible points corresponding to (k−1)P to form the public key kP.

13. A method according to claim 12, wherein said elliptic curve being of the form $y_2 + x_y = x_3 + ax_2 + b$ and said field being selected to have elements $A2^i (o \leq i \leq m)$ that constitute a normal basis.

14. A method according to claim 13, including representing the coordinates of a point on said curve as a set of vectors, each vector representing a coordinate of said point and having m binary digits, each of which represents the coefficients of $A2^i$ in the normal basis representation of said vector.

15. A method according to claim 14, said adding of points kP and (k−1)P utilizes only said x coordinates of said points and kP−(k−1)P.

16. A method accord to claim 15, said x coordinate of said added points is obtained by computing $$x_3 + x_4 = \frac{x_1 x_2}{(x_2 + x_2)^2}$$

where $x_1$, $x_2$ are the x coordinates of kP and (k−1)P, $x_3$ is the x coordinate of kP+(k−1)P and $x_4$ is the x coordinate of kP+(k−1)P.

17. A method according to claim 16, further including converting said coordinates to projective coordinates.

18. A method according to claim 17, wherein said coordinate x3 being obtained by computing $x_3 = x1^4 + bz1^4$.

19. A method according to claim 15, including computing a y coordinate of said point kP from said x coordinate by utilizing an x coordinate of said point (k−1)P and said point kP.

20. A method according to claim 19, including computing a y coordinate of said point kP by substituting said x coordinate of kP in said elliptic curve equation.

21. A method of verifying a digital signature, said method comprising:
   a) computing at least one sP and eQ by:
      i) utilizing the x coordinate of a seed point P to perform successive double and add operations on P to obtain the values of the x coordinates of (k−1)P and kP;
      ii) determining at least one point on an elliptic curve corresponding to one of the possible values of (k−1)P by deriving a possible value of the y coordinate of (k−1)P from the x coordinate of (k−1)P;
      iii) determining at least one point on the elliptic curve corresponding to one of the possible values of kP by deriving a possible value of the y coordinate of kP from x coordinate of kP;
      iv) selecting as the value kP the one of the possible points corresponding to kP that differs by P from one of the possible points corresponding to (k−1)P to form the elliptic curve
   b) computing sP−eQ; and
   c) checking of sP−eQ=r to verify the digital signature.

22. A method of computing an elliptic curve digital signatures comprising:
   a) utilizing the x coordinate of a seed point P to perform successive double and add operations on P to obtain the values of the x coordinates of (k−1)P and kP;
   b) determining at least one point on the elliptic curve corresponding to one of the possible values of (k−1)P by deriving a possible value of the y coordinate of (k−1)P from the x coordinate of (k−1)P;
   c) determining at least one point on the elliptic curve corresponding to one of the possible values of kP by deriving a possible value of the y coordinate of kP from x coordinate of kP;
   d) selecting as the value kP the one of the possible points corresponding to kP that differs by P from one of the possible points corresponding to (k−1)P to form the elliptic curve digital signature.

23. A method of computing a signature verification equation r=u1P+u2Q, said method comprising:
   a) computing the x coordinate of r using a formula R−u2(u1u2P=Q) to form the signature verification equation.

24. A method according to claim 23 wherein the y coordinate of r is recovered using the quadratic formula.

25. A method of computing a public key KP from a point $P=(x_1, y_1)$ in an elliptic curve cryptosystem, P is a point on the elliptic curve, which is a predefined parameter of the system, said method comprising:
   a) computing projective X and Z coordinates of P;
   b) utilizing the projective X and Z coordinates of P to perform successive double and add operations on P to obtain the values of:
      (i) the projective X and Z coordinates $X_2$ and $Z_2$ of kP; and
      (ii) the projective X and Z coordinates $X_3$ and $Z_3$ of (k+1)P;
   c) combining the values of $X_2$ and $Z_2$ to derive the affine x-coordinate $x_2$ of kP; and
   d) combining the coordinates of said point P, the derived values of $x_2$ and the projective coordinates $X_3$, $Z_3$ of (k+1)P to obtain the value of the affine y-coordinate $y_2$ of the point kP to form the public key kP.

26. A method according to claim 25, wherein the elliptic curve cryptosystem is defined over a field of characteristic 2.

27. A method according to claim 26, wherein the determination of the affine y coordinate of kP is performed using the inverse of $x_1 Z_3$.

28. A method according to claim 27, wherein the determination of the affine y coordinate of kP is performed in accordance with the formula $$y_2 = (x_1 + x_2)\left(\frac{1}{x_1 Z_3}(X_3(x_1 + x_2) + Z_3 y_1) + x_2\right) + y_1.$$

29. A method according to claim 25, wherein the elliptic curve cryptosystem is defined over a field of odd characteristic.

30. A method according to claim 29, wherein the determination of the affine y coordinate of kP is performed using the inverse of $Z_3$.

31. A method according to claim 30, wherein the elliptic curve is associated with a pair of parameters a and b, and the determination of the affine y coordinate of kP is performed in accordance with the formula $$y_2 = \frac{1}{2y_1}((x_1 + x_2)(a + x_1 x_2) + 2b - x_3(x_2 - x1)^2).$$

32. A method according to claim 29, wherein the determination of the affine y coordinate of kP is performed using the inverse of $y_1 Z_3$.

33. A method according to claim 32, wherein the elliptic curve is associated with a pair of parameters a and b, and the determination of the affine y coordinate of kP is performed in accordance with the formula $$y_2 = \frac{1}{2y_1 Z_3}(Z_3((x_1 + x_2)(a + x_1 x_2) + 2b) - X_3(x_2 - x_1)^2).$$

* * * * *

UNITED STATES PATENT AND TRADEMARK OFFICE
CERTIFICATE OF CORRECTION

PATENT NO. : 6,782,100 B1  Page 1 of 1
DATED : August 24, 2004
INVENTOR(S) : Vanstone et al.

It is certified that error appears in the above-identified patent and that said Letters Patent is hereby corrected as shown below:

Column 1,
Line 5, please add the following text after the term "U.S. Pat. No. 6,141,420":
-- ,which was a Continaution of International Appln. No. PCT/CA95/00452, filed July 31, 1995; which was C-I-P of U.S. Appln. No. 08/282,263, filed July 29, 1994, abandoned, the benefit and incorporation by reference of all of which hereby maintained --.

Signed and Sealed this

Fifteenth Day of November, 2005

JON W. DUDAS
*Director of the United States Patent and Trademark Office*